Nov. 15, 1966     L. F. SCHWEITZER, JR     3,285,204
PALLET FOR STACKING, STORING AND TRANSPORTING AUTOMOBILE WHEELS
Filed Oct. 8, 1965     2 Sheets-Sheet 1
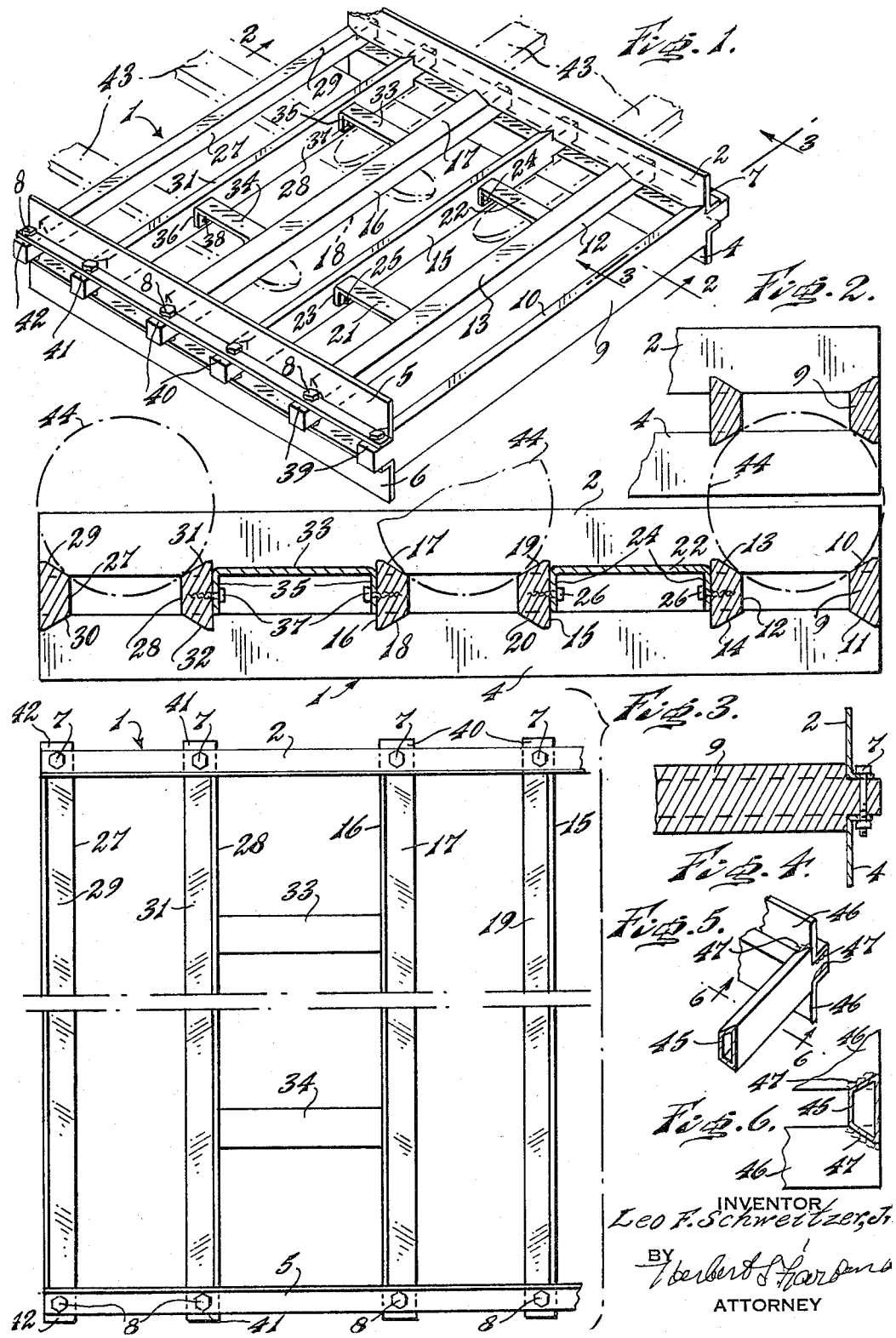
INVENTOR
Leo F. Schweitzer, Jr.
BY Herbert S. Harbans
ATTORNEY Nov. 15, 1966     L. F. SCHWEITZER, JR     3,285,204
PALLET FOR STACKING, STORING AND TRANSPORTING
AUTOMOBILE WHEELS
Filed Oct. 8, 1965     2 Sheets-Sheet 2
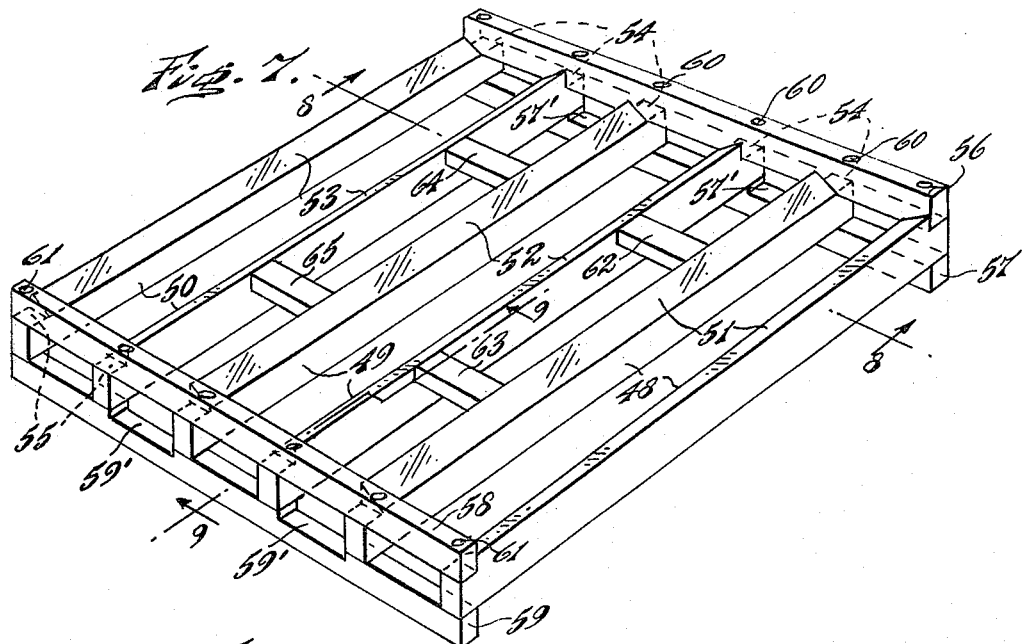
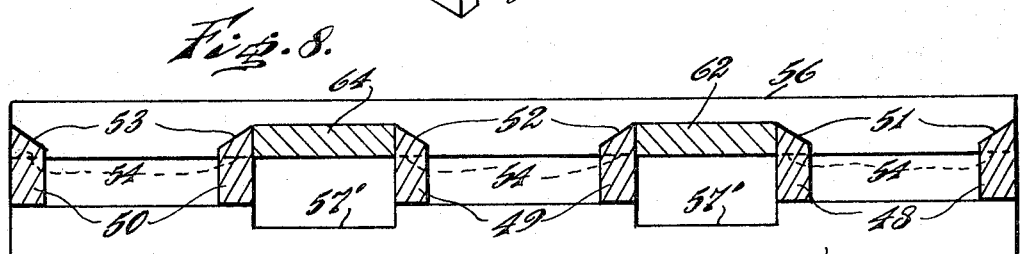
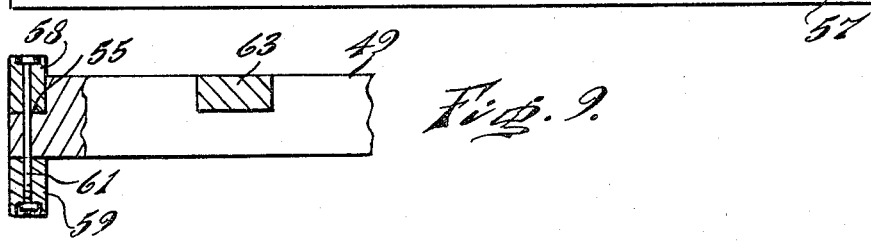
INVENTOR
Leo F. Schweitzer, Jr.
BY
ATTORNEY 3,285,204
PALLET FOR STACKING, STORING AND
TRANSPORTING AUTOMOBILE WHEELS
Leo F. Schweitzer, Jr., 1726 Wagner Ave.,
Philadelphia, Pa.
Filed Oct. 8, 1965, Ser. No. 494,105
4 Claims. (Cl. 108—55)

The object of this invention is to devise a novel pallet for stacking, storing and transporting automobile wheels which will reduce the time and cost of the operation.

A further object is to devise novel means for locking the wheels in position on the pallet.

A further object is to devise a novel pallet of rectangular form, having cross bars, the opposite sides of which are tapered to render the pallet reversible and to permit the cross bars to adapt to different size wheels.

A further object is to space the component parts to adapt them to receive the fork of a fork lift truck on any side of the pallet.

With the foregoing and other objects in view, as will hereinafter more clearly appear, my invention comprehends a novel pallet for stacking, storing and transporting automobile wheels.

For the purpose of illustrating the invention, I have shown in the accompanying drawings preferred embodiments of it, which I have found in practice to give satisfactory and reliable results. It is, however, to be understood that the various instrumentalities of which the invention consists can be variously arranged and organized and the invention is not limited to the exact arrangement and organization of these instrumentalities as herein set forth.

FIGURE 1 is a perspective view of the pallet of the invention, with the forks of a fork lift truck shown in phantom lines in two directions.

FIGURE 2 is a section on line 2—2 of FIGURE 1, on an enlarged scale.

FIGURE 3 is a section on line 3—3 of FIGURE 1.

FIGURE 4 is a fragmentary top plan view.

FIGURE 5 is a fragmentary perspective of a portion of a bar and end members, as they would appear in a modified form which would use a light metal instead of wood in the rail portion.

FIGURE 6 is a section on line 6—6 of FIGURE 5.

FIGURE 7 is a perspective view of a modified form of the pallet.

FIGURES 8 and 9 show sectional views.

Similar numerals of reference indicate corresponding parts.

Referring to the drawings:

In the form of the invention shown in FIGURES 1 to 4 the pallet is composed of a framework 1, consisting of three sets of load supporting members or bars in parallel relation to each other and held in assembled condition at each end by L shaped angles 2, 4, 5 and 6, said angles being fixed to the bars by bolts 7 at one end and bolts 8 at the opposite end. Bar 9 forming one outer edge of the frame 1 is provided at opposite edges with inclined faces 10 and 11, suitably of an angle of approximately 31 degrees, the other parallel bar 12 is suitably provided with inclined faces 13 and 14. The next set of bars 15 and 16 also have inclined faces 17, 18, 19 and 20. Interposed between bars 12 and 15 are braces 21 and 22, having depending flanges 23 and 24 and being fixed to the bars by lag screws 25 and 26. The remaining set of bars 27 and 28 also are provided with inclined faces 29, 30, 31 and 32. Interposed between bar 27 and bar 16 are similar braces 33 and 34 having depending flanges 35 and 36 and fixed to the bars by lag screws 37 and 38. All of the bars have their opposite ends cut to a reduced dimension at 39, 40, 41 and 42 to provide a flat seat for the L shaped angles before mentioned, said angles being arranged a suitable distance apart to accommodate a desired number of wheels in locked position lengthwise.

The parallel bars in each case are arranged a suitable distance apart to accommodate the forks 43 of a fork lift truck, as shown in phantom lines in FIGURE 1, and also to accommodate standard size 13, 14 or 15 inch wheels.

The pallet in this case is reversible and as shown in FIGURE 2, a pallet is placed on top of the wheels 44 in the pallet below to lock them in place. This operation may be repeated until a suitable number of filled pallets is completed, each one on top of the other.

In some instances it may be desirable to substitute a light metal such as aluminum or magnesium instead of wood construction for the load carrying bars. In FIGURES 5 and 6 the metallic bar 45 is shown fixed to the L shaped angles 46, such as by welding at 47.

In some cases it may be more economical to use an all wood construction. In FIGURES 7, 8 and 9 I have shown such construction which consists of a series of laterally spaced bars 48, 49 and 50, having upwardly diverging seats 51, 52 and 53 to receive the rims of automobile wheels, having the same angle as the previous form, and having their ends of reduced dimension and squared off as at 54 and 55 to receive end members 56, 57, 58 and 59 in parallel relation, said end members being fixed to said laterally spaced bars by fastening means such as bolts 60 and 61, as shown. The end members 57 and 59 may be cut away as at 57′ and 59′ to provide additional clearance for the forks of a fork lift truck. Interposed between the laterally spaced bars 48, 49 and 50 are suitable braces 62, 63, 64 and 65, spaced a suitable distance along said bars and fixed thereto by any suitable means such as by nailing.

Having thus described my invention, what I claim as new and desire to secure by Letters Patent is:

1. A pallet for stacking, storing and transporting automobile wheels comprising an outer frame having side bars and spaced angles connected to the end of said bars, a plurality of spaced pairs of bars connected with said angles with the bars of each pair having their inner faces faces off to provide diverging seats to receive the rims of vehicle wheels, the spacing between said angles providing openings to receive the forks of a fork lift truck.

2. The means defined in claim 1, wherein the inner walls of a pair of bars have diverging faces at the top and bottom portion, whereby the pallet is reversible.

3. The means defined in claim 1, wherein after the wheels are in position, a second pallet interlocks with the top portion of the wheels to retain them in assembled position.

4. The means defined in claim 1, wherein said spaced angles are arranged in suitable spaced relationship to provide locking means to retain in assembled position the number of wheels for which the pallet is designed.

References Cited by the Examiner

UNITED STATES PATENTS

| 2,570,757 | 10/1951 | Bowan et al. | 108—52 X |
| 3,118,400 | 1/1964 | Kemp et al. | 108—58 |
| 3,135,228 | 6/1964 | Fleming et al. | 108—55 |
| 3,149,586 | 9/1964 | Kemp et al. | 108—58 |
| 3,159,115 | 12/1964 | Nolan | 108—51 |

FOREIGN PATENTS 951,339   3/1964   Great Britain.

FRANK B. SHERRY, Primary Examiner.

G. O. FINCH, Assistant Examiner.